Jan. 30, 1923.
A. E. STORER,
INNER TUBE.
FILED JUNE 28, 1922.
1,443,392
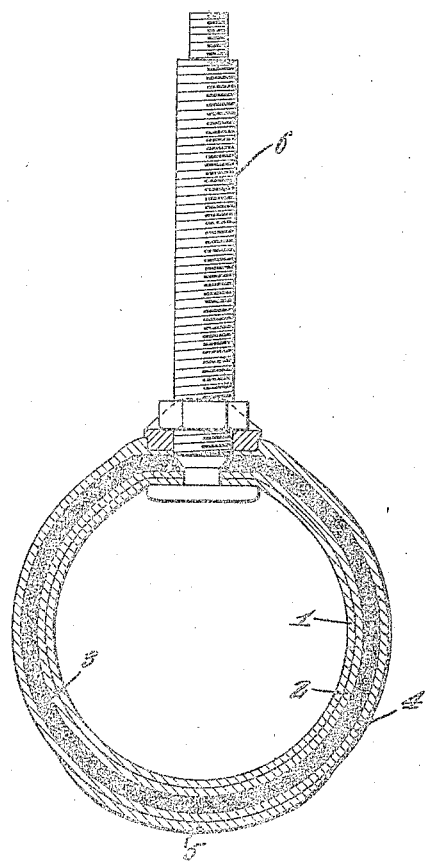
A. E. Storer, Inventor
By ........ Attorney Patented Jan. 30, 1923.

1,443,392

UNITED STATES PATENT OFFICE.

AUSTIN E. STORER, OF NEWARK, OHIO.

INNER TUBE.

Application filed June 28, 1922. Serial No. 571,382.

*To all whom it may concern:*

Be it known that I, AUSTIN E. STORER, a citizen of the United States, residing at Newark, in the county of Licking and State of Ohio, have invented a new and useful Inner Tube, of which the following is a specification.

This invention relates to inner tubes for pneumatic tires.

The object of the invention is to provide a tube of this character which is puncture and blow out proof, and which may be employed as a substitute for the tube in ordinary use.

Another object is to provide a tube of this character which is comparatively cheap to manufacture and which will prevent all possibility of tacks, nails or the like which pass through the outer shoe or casing puncturing the tube and causing deflation of the tire.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

The accompanying drawing represents a transverse section of an inner tube constructed in accordance with this invention, with an inflation valve shown in side elevation connected therewith.

In the embodiment illustrated, the tube constituting this invention comprises an inner tube 1 of vulcanized rubber having arranged around the outer face thereof a layer 2 of uncured rubber. Over the uncured layer 2 and completely encompassing it are a plurality of fabric layers 3 any desired number of which may be employed, three being here shown which will prevent all possibility of blow outs.

Arranged around the fabric layers is a layer or coating 4 of uncured rubber which is designed to prevent chafing of the fabric of the tube and also of the shoe in connection with which the inner tube is to be used.

Another layer 5 of uncured rubber is arranged around the tread portion of the tube to prevent all possibility of tacks and the like from entering at this point.

An inflation valve stem 6 is used in connection with this inner tube in the same manner as that ordinarily employed with tubes of this character, and since there is nothing novel in its construction it will not be described in detail.

From the above description it will be seen that the inner layer or tube 1 of vulcanized rubber is practically the same as the ordinary inner tube now in use and operates to carry the air while the layer 2 of uncured rubber which is arranged around the outer face of the tube 1 prevents punctures while the plurality of fabric layers 3 strengthens the tube and prevents all possibility of blow outs. As above pointed out, the layer 4 of uncured rubber which is arranged over the fabric layers is designed to prevent chafing of said layers as well as to protect the inner face of the tire shoe in connection with which this inner tube is used. The additional layer 5 which is arranged around the tread portion of the tire only as is shown clearly in the drawing operates also to prevent chafing and to reinforce the tire to prevent punctures.

From the above description it will be seen that a tube of this description may be readily substituted for those in ordinary use, and when so substituted may be inflated in the ordinary manner and will be puncture and blow out proof.

I claim:—

1. An inner tube for pneumatic tires comprising an air retaining tube of vulcanized rubber having arranged thereover a plurality of uncured layers of rubber with a fabric layer between them.

2. An inner tube for pneumatic tires comprising a tube of vulcanized rubber having arranged on the outer face thereof a coating of uncured rubber, a layer of fabric arranged over said uncured coating, and another layer of uncured rubber surrounding said fabric layer.

3. An inner tube for pneumatic tires comprising a tube of vulcanized rubber having arranged on the outer face thereof a coating of uncured rubber, a layer of fabric arranged over said uncured coating, another layer of uncured rubber surrounding said fabric layer, and a reinforcing layer of uncured rubber arranged over the tread of the tube.

In testimony that I claim the foregoing as my own, I have hereto affixed my signature in the presence of two witnesses.

AUSTIN E. STORER.

Witnesses:
CLARA MURCHLAND,
J. J. MARTIN.